Jan. 16, 1934.                    E. W. DAVIS                    1,943,515
                          GREASE DISPENSING APPARATUS
                          Original Filed Oct. 9, 1929
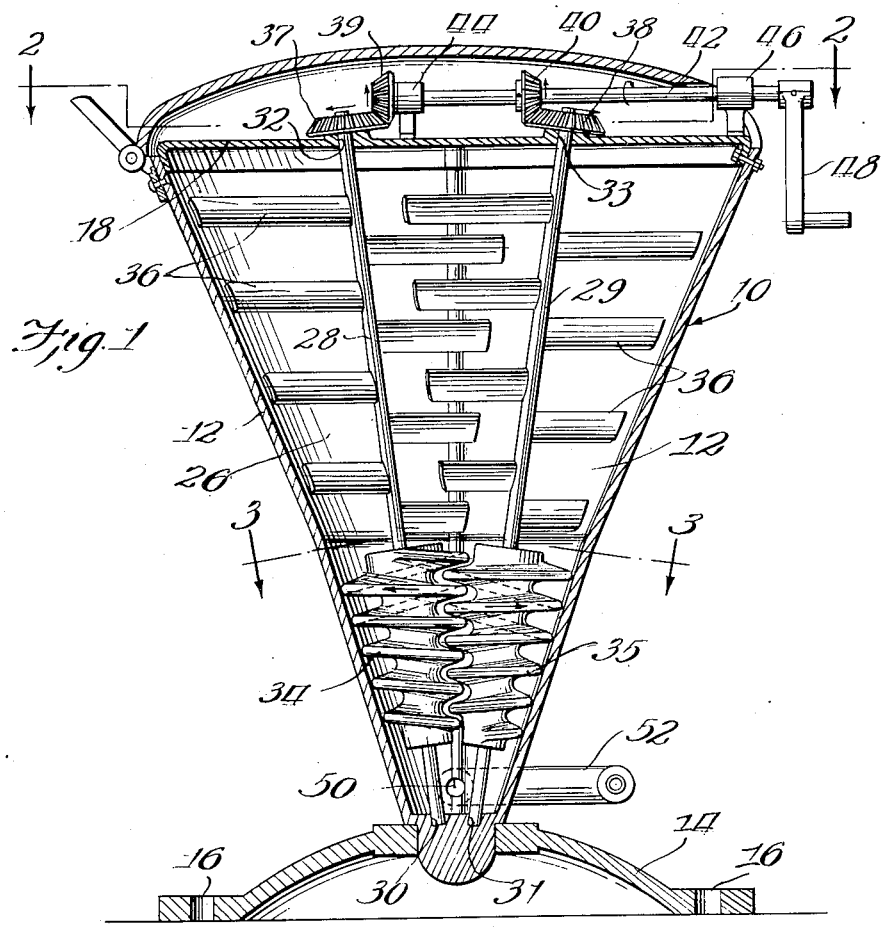
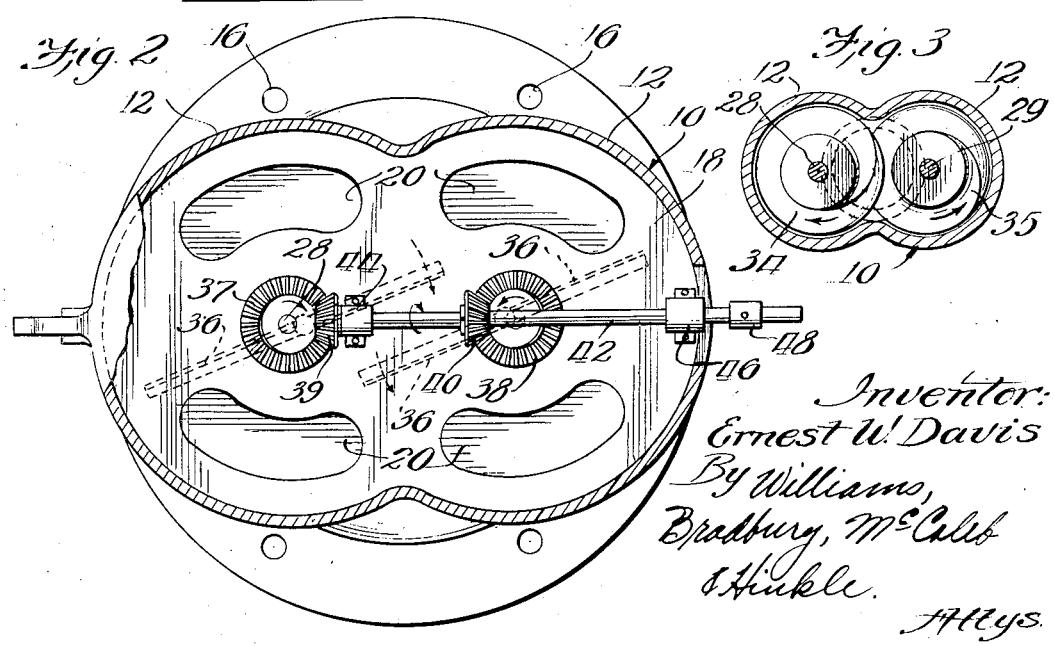
Inventor:
Ernest W. Davis
By Williams,
Bradbury, McCaleb
& Hinkle
Attys.

Patented Jan. 16, 1934

1,943,515

UNITED STATES PATENT OFFICE 1,943,515

GREASE DISPENSING APPARATUS

Ernest W. Davis, Oak Park, Ill., assignor to Alemite Corporation, Chicago, Ill., a corporation of Delaware Original application October 9, 1929, Serial No. 398,323. Divided and this application May 16, 1932. Serial No. 611,494

15 Claims. (Cl. 221—47.1)

My invention relates in general to dispensing apparatus, and in particular to that class of apparatus utilized for effecting the discharge of plastic and semi-fluid materials such as grease, pastes, etc., under a high pressure.

An object of my invention is the provision of a device capable of discharging extremely viscous semi-fluids at a high pressure.

A further object of my invention is the provision of a rotary spiral conveyor for advancing the material to helical conveyor screws for discharging the same at a high pressure.

Another object of my invention is the provision in a device of the type specified of a new and improved method of discharging the material by means of intermeshing conveyor screws.

A further object of my invention is the provision of a new and improved type of lubricant container for use with my dispensing apparatus.

A further object of my invention is the provision of a container for semi-fluid substances having vanes and scrapers therein for loosening the material from the walls of the container to facilitate the discharge of said material.

Another object of my invention is the provision of a highly efficient device susceptible of inexpensive commercial production.

Other objects and advantages of my invention will be discernible from the following description, reference being made to the accompanying sheet of drawings, in which:

Fig. 1 is a vertical cross sectional view of my improved dispenser;

Fig. 2 is a plan view taken on the line 2—2 of Fig. 1; and

Fig. 3 is a view taken on the line 3—3 of Fig. 1.

This application is a division of my prior copending application, Serial No. 398,323, filed October 9, 1929, for Grease dispensing apparatus, which has matured into Patent No. 1,859,290, granted May 24, 1932.

In the embodiment of my invention illustrated in Fig. 1 of the drawing, I have shown a container indicated generally at 10, substantially in the form of two intersecting cones 12, having divergent axes, supported upon a base plate 14 which is provided with apertures 16 for bolting the dispenser to a foundation if desired.

The container 10 is provided at the top with a septum 18 having apertures 20 therein. A cover 22 pivoted on the hinge 24 encases the gearing mechanism positioned above the septum and serves as a closure for the container.

The container provides a chamber 26 for housing the grease impelling and ejecting mechanism, which comprises a pair of divergently mounted shafts 28, 29 journaled at their lower ends in sockets 30, 31 respectively in the bottom wall of the container, and at their upper ends in suitable bearings 32 and 33 provided in the septum 18.

Suitably secured upon each of the shafts 28 and 29 at the lower end thereof are intermeshing helical conveyor screws 34 and 35. Above the helical conveyor screws 34, 35 and secured to the shafts 28 and 29 are a plurality of vanes or blades 36 alternately positioned on opposite sides of the shafts 28 and 29; these blades being inclined in the direction of their rotation and having a concave surface for engaging the grease and feeding the same downwardly in the container. Referring to Fig. 2 of the drawing, the relative position of the blades carried by each of the shafts is shown. In order that the blades of the respective shafts do not clash during rotation, I have set the blades upon the shaft 29 slightly ahead of the blade on the shaft 28.

Above the septum, bevel gears 37 and 38, suitably secured to the shafts 28, 29 respectively, are adapted to mesh with gears 39 and 40 secured upon a driving shaft 42. The driving shaft 42 is journaled in bearings 44 and 46 mounted upon the septum 18. In order that the blades of the respective shafts rotate in opposite directions the gears 39 and 40 are secured at opposite sides of the bevel gears 37 and 38 respectively. A crank handle 48 adapted to be rotated in a clockwise direction is provided at the outer end of the driving shaft 42 for operating the dispensing mechanism.

The helical screw conveyors 34 and 35 are preferably frusto conical in design but under certain conditions these conveyors might be made in the shape of threaded cylinders. From an inspection of Fig. 3 it will be noted that the housing wall of the container 10 closely surrounds the conveyors to preclude the bypassing of the grease between the wall of the container and the conveyor threads. These screw conveyors 34 and 35 have right and left hand threads so arranged that they intermesh and so that the conveyors may be revolved in opposite directions. At the bottom of the chamber a port 50 is provided having a suitable conduit 52 for conducting the discharged material to any desired outlet.

In operation, the container is charged, with the material to be dispensed, through apertures 20 in the septum 18. The manipulation of the crank handle in a clockwise direction effects the rotation of the blades and the conveyor screws carried by the shafts 28 and 29. The rotation of the blades compacts the material with which the container is charged, advances the same downwardly in the chamber, and feeds it to the helical conveyor screws 34 and 35. These conveyor screws rotating in opposite directions, eject the grease through port 50 from the container and into the conduit 52.

While the embodiment of the invention illustrated is manually operable it is evident that a motor-driven connection may be substituted without departing from the spirit of the invention, and I therefore desire the present embodiment to be considered in all respects as illustrative and not restrictive, reference being had to the appended claims rather than the foregoing description to indicate the scope of my invention.

Having thus described my invention what I claim as new and desire to secure by Letters Patent is:

1. A device for dispensing grease, including an inverted bi-conoidal-shaped grease chamber, a discharge conduit communicating with its lower end, a plurality of conveyor shafts mounted therein, means for rotating said shafts in opposite directions, a plurality of inclined blades rigidly attached to at least one of said shafts and intermeshing screw conveyors on said shafts adjacent the lower end of said chamber.

2. A device for dispensing grease, including an inverted bi-conoidal-shaped grease chamber, a discharge conduit communicating with its lower end, a plurality of conveyor shafts mounted therein, means for rotating said shafts in opposite directions, a plurality of inclined blades rigidly attached to at least one of said shafts and intermeshing conically-shaped screw conveyors on said shafts adjacent the lower end of said chamber.

3. A device for dispensing grease, including an inverted bi-conoidal-shaped grease chamber, a discharge conduit communicating with its lower end, a plurality of conveyor shafts mounted therein, means for rotating said shafts in opposite directions, a plurality of inclined blades rigidly attached to at least one of said shafts and intermeshing right and left hand screw conveyors on said shafts adjacent the lower end of said chamber.

4. In an apparatus for dispensing grease, a container having a reduced portion therein, a pair of intermeshing single thread screw conveyors in the reduced portion of said container, means for rotating said conveyors in opposite directions and an outlet conduit communicating with the lower end of said reduced portion for discharging grease under pressure.

5. In an apparatus for dispensing grease, a container having a reduced portion therein, a pair of substantially vertical intermeshing spiral screw conveyors in the reduced portion of said chamber, the pitch of the screw thread on each of said conveyors being such that a plurality of convolutions of the same thread will be intermeshed with the other conveyor at all times, means for rotating said conveyors in opposite directions, and an outlet conduit communicating with the smaller end of said reduced portion for discharging grease under pressure.

6. In an apparatus for dispensing semi-solids, an inverted bi-conoidal-shaped container having an outlet conduit communicating with the lower end thereof, a pair of substantially vertical conveyor shafts mounted in said container, means for rotating said shafts in opposite directions, a plurality of blades rigidly attached to said shafts, intermeshing conical screw conveyors on said shaft adjacent the lower end of said container and positioned closely adjacent the inner walls thereof.

7. In an apparatus for dispensing lubricants, a double intersecting cone-shaped container having an outlet conduit communicating with one end thereof, a plurality of conveyor shafts longitudinally mounted in said container, means for rotating said shafts, a plurality of blades rigidly attached to said shafts, intermeshing screw conveyors on said shafts adjacent the discharge end of said container and positioned substantially in contact with the walls thereof.

8. In a device for dispensing plastic materials, the combination of a container, having integral twin cone-shaped body portions, with an outlet at the bottom of said container, divergently mounted shafts in said container positioned coincidental with the axes of the cone-shaped body portions, and single thread intermeshing spiral means carried by said shafts cooperating with said body members for effecting the discharge of material from the container through said outlet.

9. In a grease dispensing device the combination of a container, having an outlet port, with a pair of shafts divergently mounted in said container, a helical conveyor screw secured to each of said shafts adjacent the outlet port of said container, said conveyor screws being adapted to intermesh, a plurality of vanes secured to each of said shafts, and means for rotating the vanes and conveyor screw carried by the respective shafts to effect the discharge of grease from said container.

10. In a grease dispensing device the combination of a container comprising twin body portions with an outlet port therefor, a shaft carrying a plurality of blades and a conveyor screw mounted in each of said body portions, the conveyor screws being mounted to effect an intermeshing action, and means for effecting the rotation of said conveyor screws to discharge grease from said container through said outlet port.

11. In a grease dispensing device the combination of a container having an outlet port, a pair of shafts divergently mounted in said container, a pair of intermeshing helical screw conveyors secured to said shafts respectively and mounted adjacent the outlet port of said container, means for rotating said shaft and screws to effect the discharge of grease from said container through said outlet port, and a plurality of vanes secured to each of said shafts and adapted to rotate therewith, said vanes being adapted to feed grease to said conveyor screws.

12. In a grease dispensing device the combination of a container having a supporting base therefor with means for effecting the discharge of grease from said container, said means comprising a pair of shafts mounted in said container, intermeshing conveyor screws and a plurality of blades carried by said shafts, and gearing mechanism operative to effect the rotation of said shafts, screws and blades for discharging grease from said container.

13. In a grease dispensing device the combination of an integral container comprising twin body portions with a supporting base therefor, a shaft in each of said body portions carrying cooperating means for effecting the discharge of grease from said container, an apertured partition secured to the container and providing bearing surfaces for said shafts, a cover hingedly secured to said container and providing a compartment above said partition, and gearing mechanisms disposed in said compartment and carried by said partition operable to rotate said shaft and cooperating means for discharging grease from said container.

14. In a grease dispensing device the combination of a container having an outlet port, a pair of shafts mounted in said container, and cooperating spiral means carried by each of said shafts for discharging grease from said container, each of said means having at least one complete convolution.

15. In a grease dispensing device, the combination of a container having an outlet port, a pair of shafts mounted in said container, and cooperating spiral means carried by each of said shafts for discharging grease from said container, said spiral means comprising helical screw members secured adjacent the outlet port, and a plurality of vanes positioned above said screw members for feeding grease downwardly to said screw members.

ERNEST W. DAVIS.